US010428730B2

(12) United States Patent
Gosz et al.

(10) Patent No.: US 10,428,730 B2
(45) **Date of Patent: *Oct. 1, 2019**

(54) BILATERAL ENGINE CONTROL SYSTEM

(71) Applicant: Fairbanks Morse, LLC, Charlotte, NC (US)

(72) Inventors: Raymond Gosz, Delavan, WI (US); Omar Elkolaly, Ann Arbor, MI (US)

(73) Assignee: FAIRBANKS MORSE, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,848

(22) Filed: Nov. 29, 2018

(65) Prior Publication Data

US 2019/0093552 A1 Mar. 28, 2019

Related U.S. Application Data

(63) Continuation of application No. 15/157,100, filed on May 17, 2016, now Pat. No. 10,161,307.

(51) Int. Cl.
*F02D 41/30* (2006.01)
*F02B 75/28* (2006.01)
(Continued)

(52) U.S. Cl.
CPC .............. *F02B 75/282* (2013.01); *F01B 7/02* (2013.01); *F01B 7/14* (2013.01); *F02B 25/08* (2013.01);
(Continued)

(58) Field of Classification Search
CPC ...... F02D 41/30; F02D 41/3005; F02D 41/36; F02D 41/3809; F02B 75/282
See application file for complete search history.

(56) References Cited

U.S. PATENT DOCUMENTS 6,182,619 B1 * 2/2001 Spitzer .................... F02B 25/08 123/51 B
8,413,619 B2 * 4/2013 Cleeves .................... F01B 7/14 123/48 B (Continued)

FOREIGN PATENT DOCUMENTS

GB 2530761 A 4/2016
WO 2011144312 A1 11/2011

OTHER PUBLICATIONS

PCT Application No. PCT/US2017/032434, International Search Report and Written Opinion; dated Aug. 7, 2017, 8 pages.

*Primary Examiner* — Kevin A Lathers
(74) *Attorney, Agent, or Firm* — Perkins Coie LLP

(57) ABSTRACT

Technology is provided for a bilateral engine control system for use on a multi-cylinder opposed piston engine. The system includes first and second sets of injectors, each set mountable on first and second sides of an engine. Each injector is in fluid communication with a corresponding cylinder of the engine. First and second engine control units are each connected to a respective set of injectors. First and second crankshaft speed sensors are connected to respective engine control units. The first engine control unit independently controls the first set of injectors based on a first speed signal and the second engine control unit independently controls the second set of injectors based on a second speed signal. The first engine control unit and the second engine control unit are configured to activate corresponding injectors of the first and second sets of injectors at substantially the same time.

10 Claims, 11 Drawing Sheets

(51) Int. Cl.

| | |
|---|---|
| ***F02D 41/34*** | (2006.01) |
| ***F02B 25/08*** | (2006.01) |
| ***F01B 7/02*** | (2006.01) |
| ***F01B 7/14*** | (2006.01) |
| ***F02D 41/00*** | (2006.01) |
| ***F02D 41/26*** | (2006.01) |

(52) U.S. Cl.

CPC ............ *F02B 75/28* (2013.01); *F02D 41/009* (2013.01); *F02D 41/0097* (2013.01); *F02D 41/266* (2013.01); *F02D 41/30* (2013.01); *F02D 41/34* (2013.01); *Y02T 10/44* (2013.01)

(56) References Cited

U.S. PATENT DOCUMENTS

| | | | | |
|---|---|---|---|---|
| 10,161,307 | B2 * | 12/2018 | Gosz | F02D 41/009 |
| 2002/0023598 | A1 | 2/2002 | Valentin et al. | |
| 2003/0010324 | A1 * | 1/2003 | Joos | F02D 41/20<br>123/478 |
| 2005/0126545 | A1 | 6/2005 | Shafer et al. | |
| 2012/0055457 | A1 | 3/2012 | Wong et al. | |
| 2015/0128902 | A1 | 5/2015 | Joshi | |

* cited by examiner

BILATERAL ENGINE CONTROL SYSTEM

CROSS REFERENCE TO RELATED APPLICATIONS

This application is a continuation of U.S. patent application Ser. No. 15/157,100, filed May 17, 2016, entitled "BILATERAL ENGINE CONTROL SYSTEM," which is incorporated by reference herein in its entirety.

TECHNICAL FIELD

This patent application is directed to engine control systems and, more specifically, to a bilateral engine control system for use on multi-cylinder opposed piston engines.

BACKGROUND

Typical engine control systems include an engine control unit that receives input signals from a single set of sensors and controls a single set of injectors based on the signals from the sensors.

BRIEF DESCRIPTION OF THE DRAWINGS

Embodiments of the bilateral engine control system introduced herein may be better understood by referring to the following Detailed Description in conjunction with the accompanying drawings, in which like reference numerals indicate identical or functionally similar elements.

Figure 1:
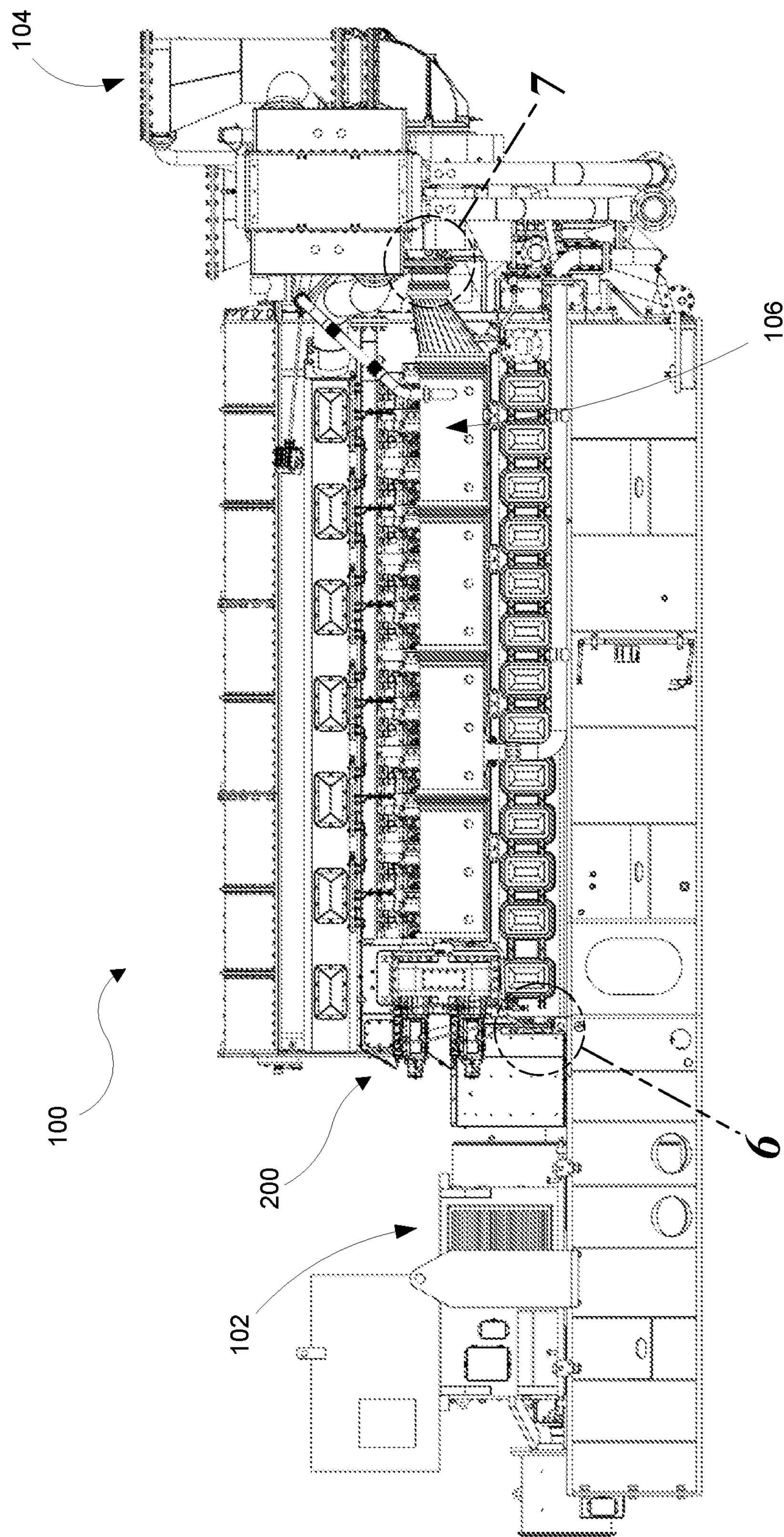
FIG. 1 is a side view in elevation of a multi-cylinder opposed piston engine according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A bilateral engine control system for use on a multi-cylinder opposed piston engine is disclosed. In an embodiment, the system includes a first set of fuel injectors mountable on a first side of an engine, each in fluid communication with a corresponding cylinder of the engine and a second set of fuel injectors mountable on a second side of the engine, each in fluid communication with a corresponding cylinder of the engine. A first engine control unit is connected to the first set of injectors and a second engine control unit is connected to the second set of injectors. A first crankshaft speed sensor is connected to the first engine control unit and operative to provide a first speed signal indicative of a speed and position of a crankshaft of the engine. A second crankshaft speed sensor is connected to the second engine control unit operative to provide a second speed signal indicative of a speed and position of the crankshaft. The first engine control unit independently controls the first set of injectors based on the first speed signal and the second engine control unit independently controls the second set of injectors based on the second speed signal, and wherein the first engine control unit and the second engine control unit are configured to activate each injector of the first set of injectors and a corresponding injector of the second set of injectors at substantially the same time.

General Description

Various examples of the device and systems introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a vertically oriented multi-cylinder opposed piston engine 100 according to a representative embodiment. In some embodiments, engine 100 is configured for electrical power generation and is connected to a generator 102. In other embodiments, the engine may directly or indirectly drive equipment or propulsion systems, such as for example and without limitation, pumps, drive trains, wheels, propellers, etc. Engine 100 may be used in mobile as well as stationary applications. The engine 100 includes a bilateral engine control system 200, described more fully below, as well as an air intake system 104 and an exhaust system 106.

Figure 2:
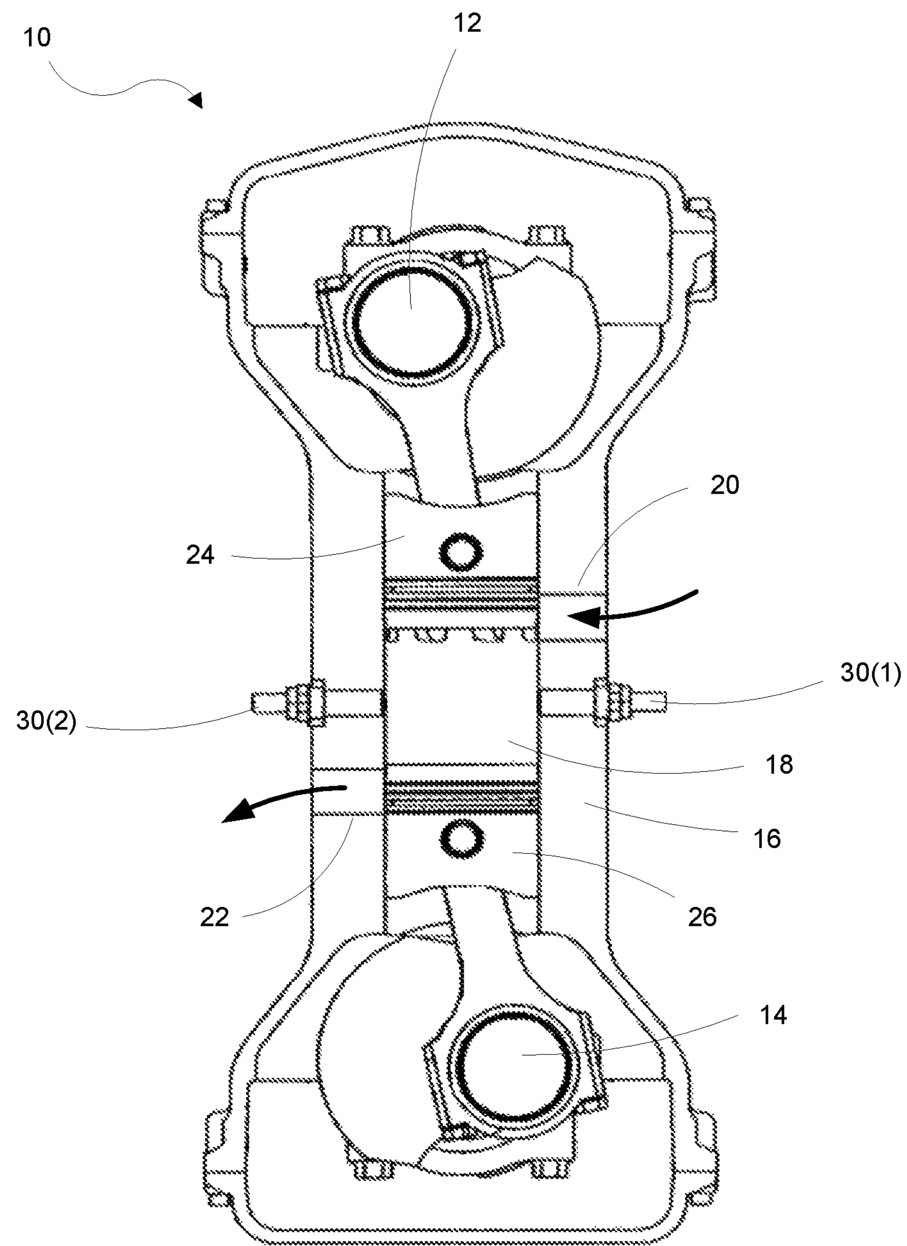
FIG. 2 is a schematic representation of a vertically oriented opposed piston engine.

FIG. 2 is a simplified schematic representation of an opposed piston engine according to the disclosed technology. Opposed piston engine 10 includes a vertically oriented cylinder 16 that encloses a combustion chamber 18 between first and second pistons 24 and 26, respectively. First piston 24 drives a first or upper crankshaft 12 and second or lower piston 26 drives a second or lower crankshaft 14. The designation of upper, lower, left, right, or the like provides relative orientation on the figure and should not be considered limiting. The upper and lower crankshafts 12 and 14 are rotatably connected together with a plurality of spur gears (not shown). Air from an intake system, such as intake system 104, is forced into the combustion chamber 18 through intake port 20. Exhaust gases are exhausted through exhaust port 22 and into an exhaust system, such as exhaust system 106. Engine 10 includes a pair of injectors 30(1) and 30(2) that provide fuel to the combustion chamber 18. In the illustrated embodiment, the injectors 30 are diametrically opposed to each other. In some embodiments, the injectors 30 are configured to supply a liquid fuel, such as diesel, to the combustion chamber 18. In other embodiments, the injectors 30 can be configured for gaseous fuel such as natural gas. In some embodiments, each injector can be configured to inject a different type of fuel. For example, injector 30(1) can be configured to supply diesel to the combustion chamber 18 while injector 30(2) is configured to supply natural gas to the combustion chamber 18.

Figure 3:
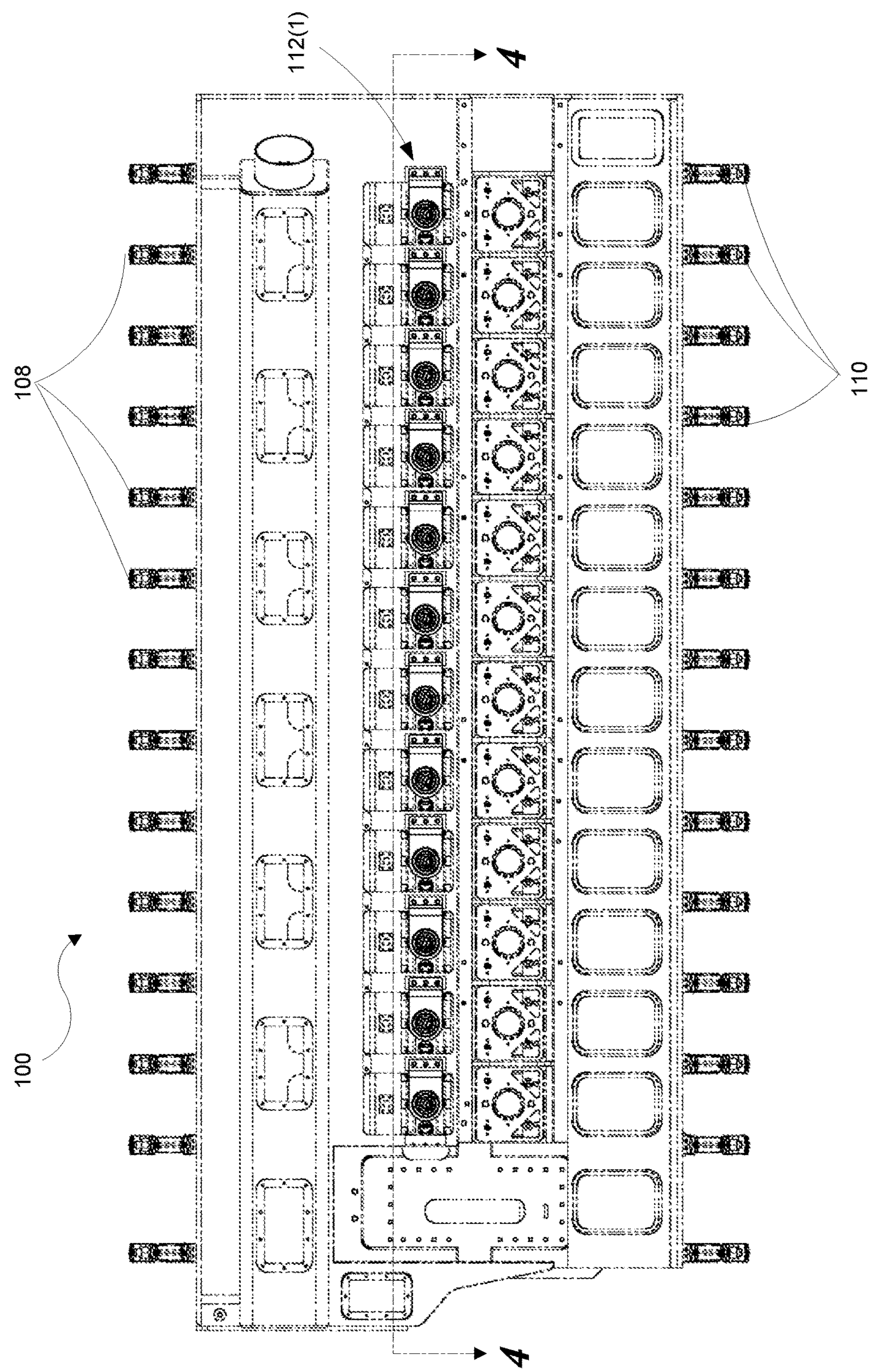
FIG. 3 is a side view in elevation of the engine shown in FIG. 1 with various components removed for clarity.
Figure 4:
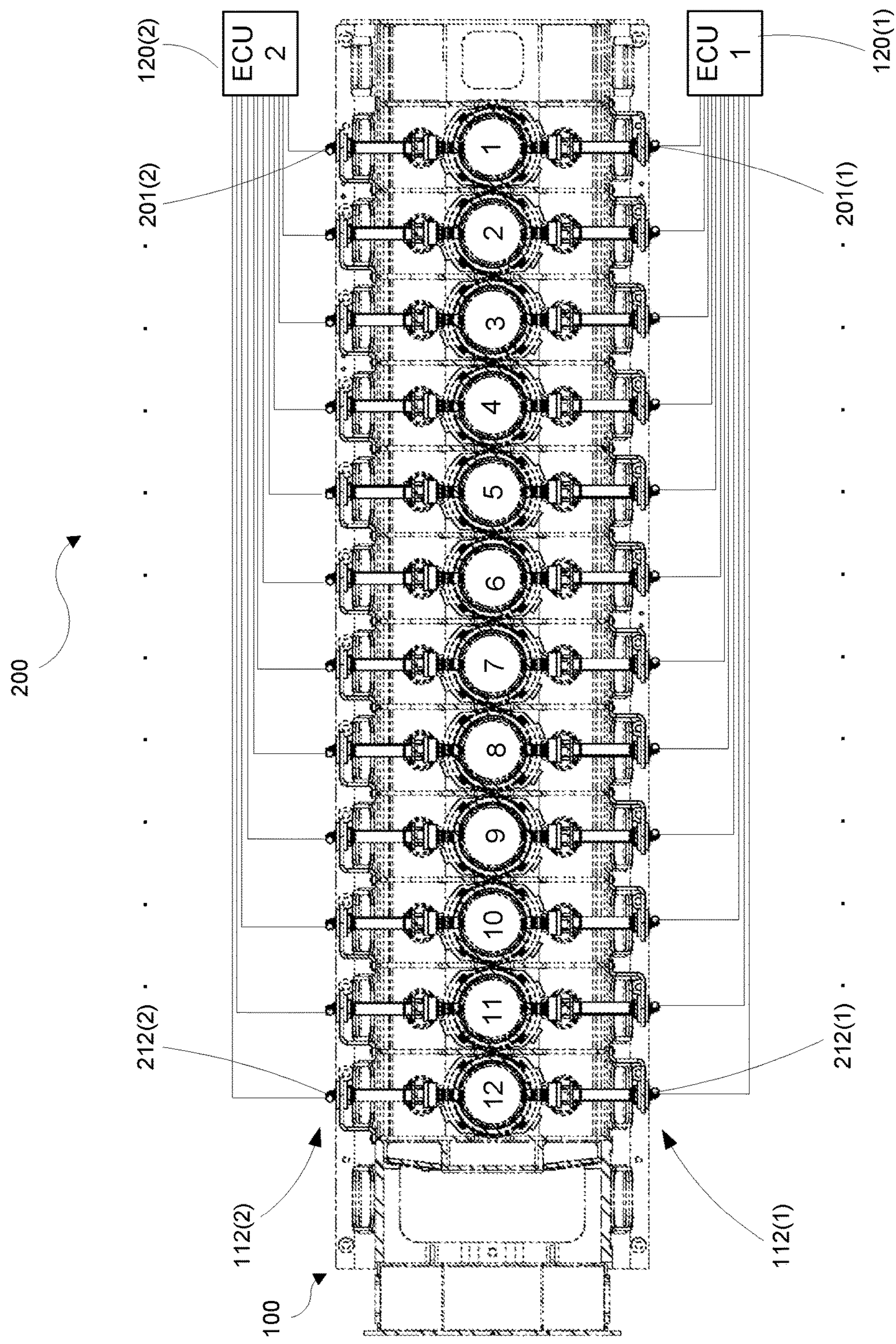
FIG. 4 is a cross-sectional view of the engine taken about line 4-4 in FIG. 3.

As shown in FIG. 3, engine 100 includes a plurality of upper bearing journals 108 to support a first or upper crankshaft (not shown). Similarly, the engine includes a plurality of lower bearing journals 110 to support a lower crankshaft (not shown). It can be appreciated from the figure that engine 100 is a 12 cylinder engine and is supplied on a first side of the engine with a first set of injectors 112(1). With further reference to FIG. 4, the bilateral engine control system 200 includes a second set of injectors 112(2) mounted on the opposite or second side of the engine 100, as well as the first set of injectors 112(1). Thus, each cylinder, numbered 1-12, is fed by two diametrically opposed fuel injectors, one on each side of the engine. For example, cylinder 1 receives fuel from injector 201(1) and 201(2). Although the injectors are described above as being diametrically opposed, in some embodiments, the injectors can be positioned on generally opposite sides of the cylinder without being exactly diametrically opposed.

The first set of injectors 112(1) includes 12 fuel injectors 201(1)-212(1). Similarly, the second set of fuel injectors 112(2) includes 12 fuel injectors 201(2)-212(2). Each set of injectors 112(1) and 112(2) are controlled by a separate engine control unit (ECU). For example, the first set of injectors 112(1) is independently controlled by a first ECU 120(1). Similarly, the second set of injectors 112(2) is independently controlled by a second ECU 120(2). In other words, each side of the engine has its own control system. As will be explained further below, the ECU 120(1) and ECU 120(2) coordinate to cause the first set of injectors 112(1) and the second set of injectors 112(2) to inject fuel in a defined sequence. In some embodiments, the first ECU 120(1) and the second ECU 120(2) are configured to activate each injector of the first set of injectors 112(1) and a corresponding injector of the second set of injectors 112(2) at substantially the same time.

Figure 5:
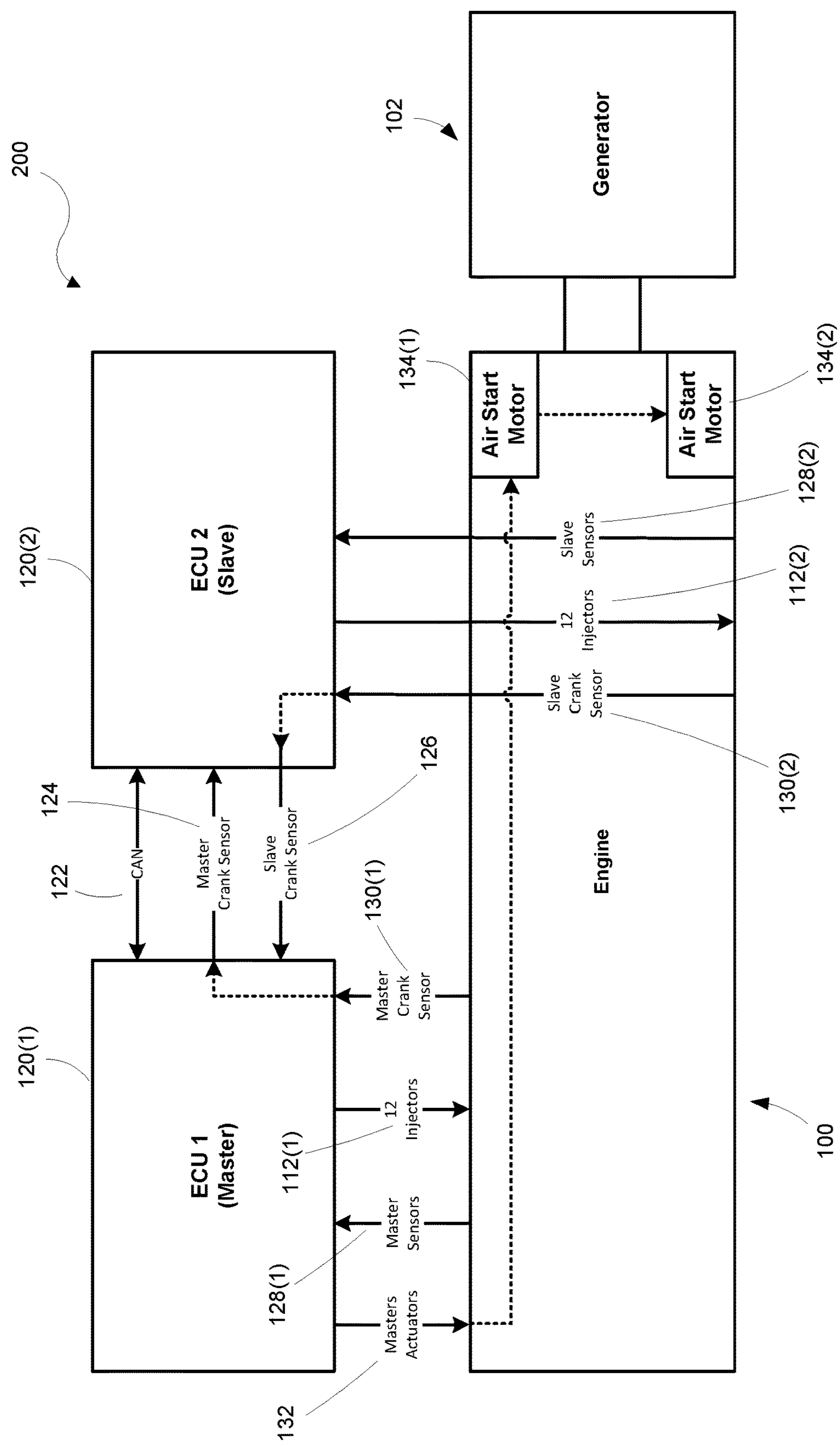
FIG. 5 is a schematic representation of a bilateral engine control system according to a representative embodiment.

FIG. 5 is a schematic representation of the bilateral engine control system 200. In some embodiments, the ECUs can be configured as a master-slave arrangement. For example, the first ECU 120(1) can be configured as a master control unit while the second ECU 120(2) can be configured as a slave control unit. In some embodiments, the master-slave configuration allows the master clock to coordinate the sequence of the slave's associated injectors. Each ECU is in communication with a separate crank sensor which picks up the crankshaft speed of the engine 100. For example, ECU 120(1) is connected to a first crank sensor 130(1) and ECU 120(2) is connected to a second crank sensor 130(2). In some embodiments, the first ECU 120(1) independently controls the first set of injectors 112(1) based on the first crank sensor 130(1) and the second ECU 120(2) independently controls the second set of injectors 112(2) based on the second crank sensor 130(2). If the ECUs register a discrepancy in engine speed from the crank sensors, the master ECU's speed input can take precedence. In some embodiments, the first ECU 120(1) is in communication with a set of sensors 128(1) and the second ECU 120(2) is in communication with a second set of sensors 128(2). Although the first ECU 120(1) and the second ECU 120(2) operate independently, they can share sensor data in the event of a sensor malfunction. Furthermore, if one or the other of the ECUs fails, the engine 100 can continue to run on one set of injectors at reduced power.

Although the first ECU 120(1) and the second ECU 120(2) are in communication with their own crank sensors, there is communication provided between the ECUs either through a controller area network (CAN) 122 or separate dedicated master and slave crank sensor communication lines 124 and 126, respectively. In some embodiments, the master control unit (e.g., first ECU 120(1)) can also actuate various actuators 132. For example, actuators 132 can include air start motors 134(1) and 134(2).

Figure 7:
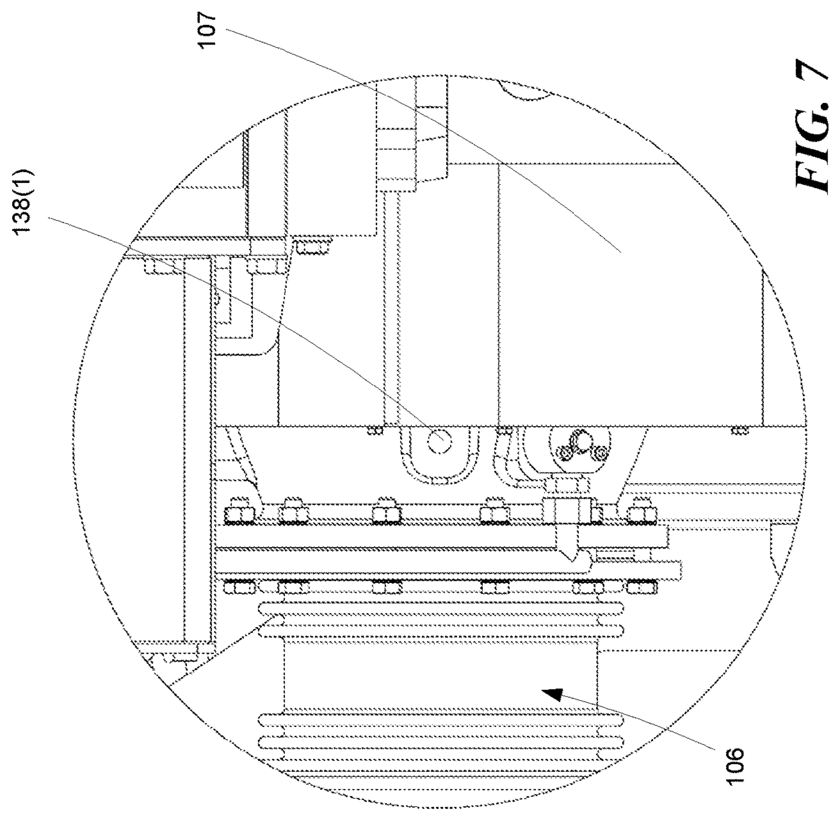
FIG. 7 is an enlarged partial view of the turbine inlet temperature sensor introduced in FIG. 1.
Figure 6:
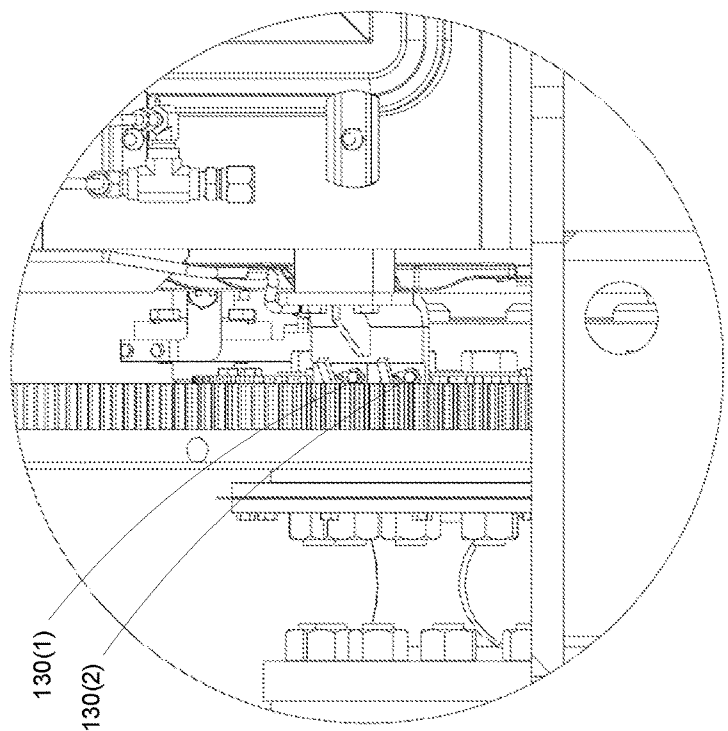
FIG. 6 is an enlarged partial view of the speed sensors introduced in FIG. 1.

Turning to FIGS. 6 and 7, the first set of sensors 128(1) can include various sensors such as a speed sensor 130(1) and a turbine inlet temperature sensor 138(1). As mentioned above, the speed sensor 130(1) measures the crankshaft speed and provides the first ECU 120(1) with timing and position information in order to control the first set of injectors 112(1). The turbine inlet temperature sensor 138(1) measures the temperature of the exhaust coming from the exhaust 106 and entering the turbo charger 107. The second sensor set 128(2) can include similar sensors such as the second crankshaft speed sensor 130(2) and a second turbine inlet temperature sensor (not shown).

Figure 8:
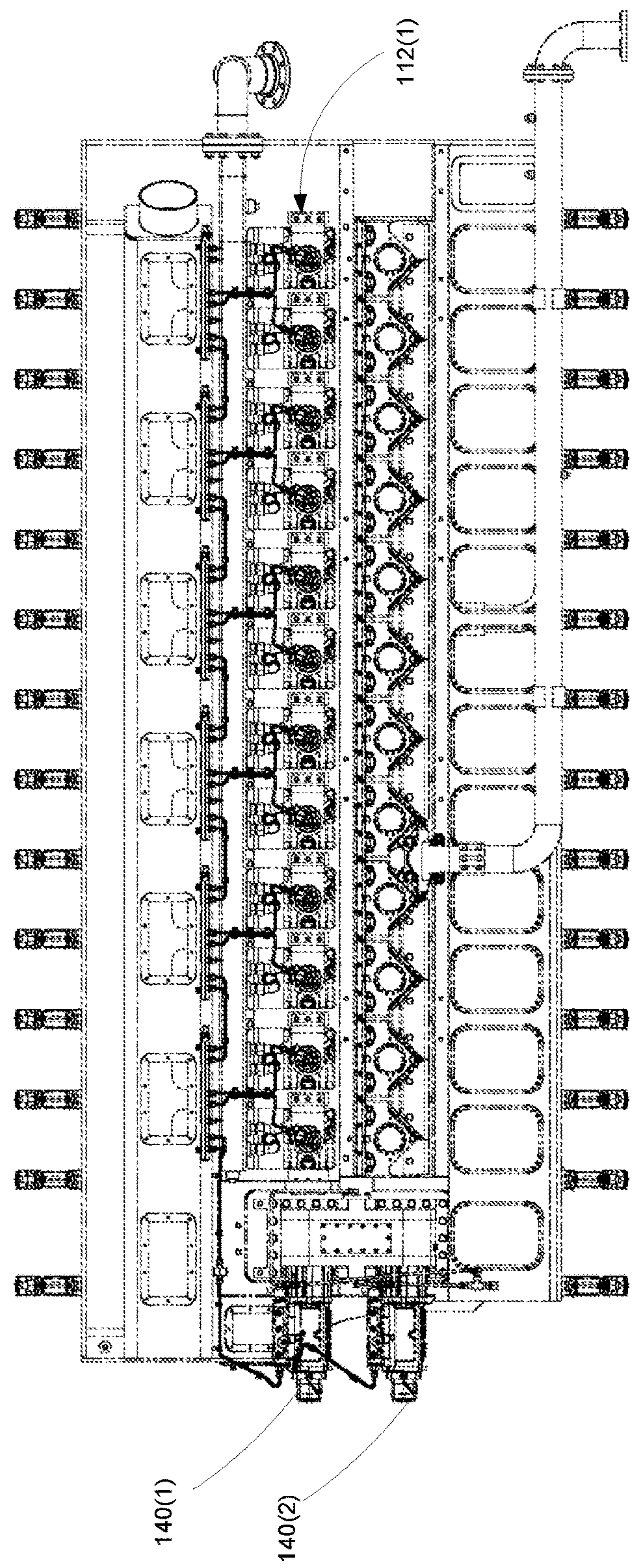
FIG. 8 is a side view in elevation illustrating a portion of the fuel supply system.
Figure 9:
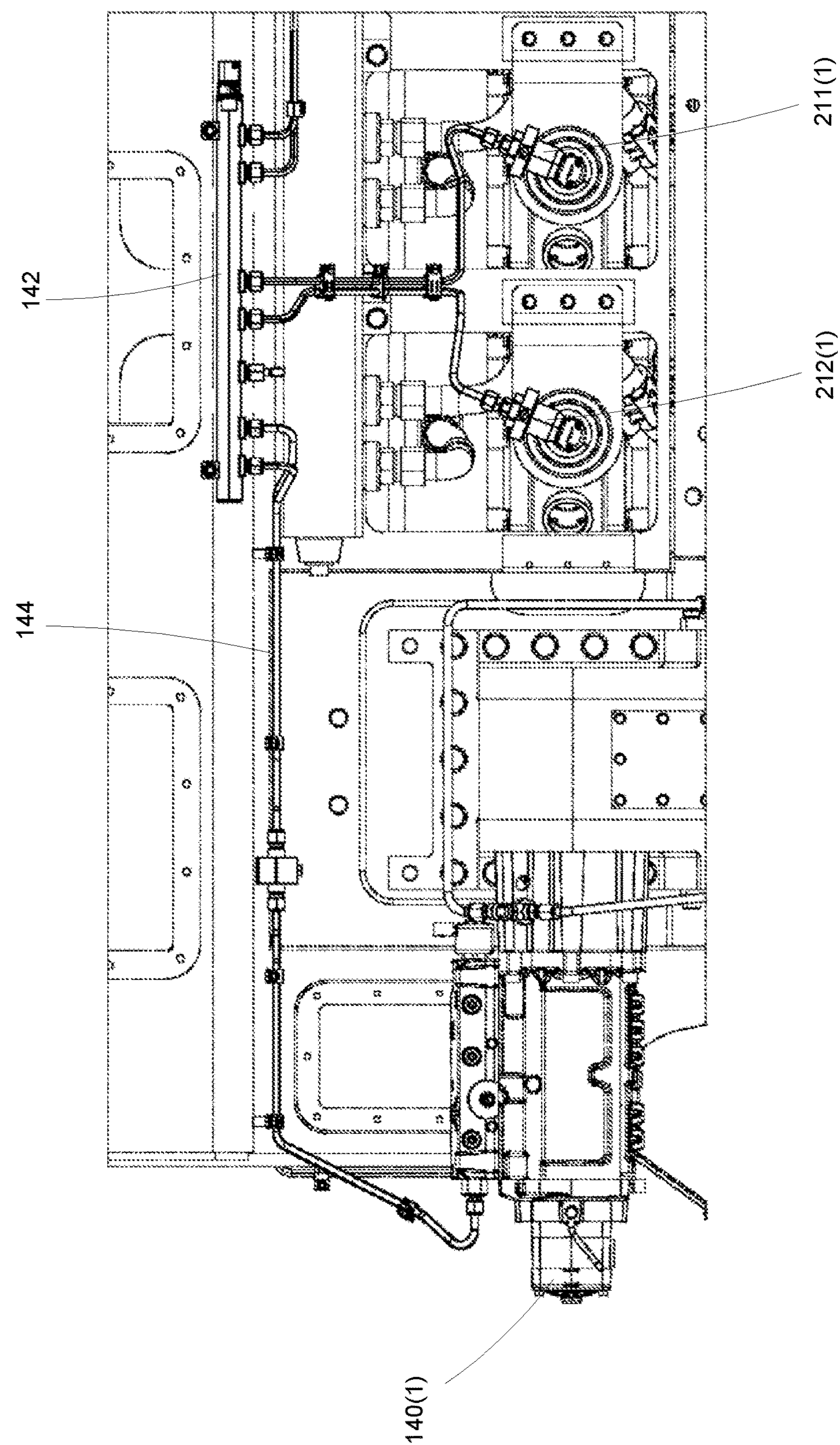
FIG. 9 is an enlarged partial view of the fuel pump shown in FIG. 8.

As shown in FIG. 8, the bilateral engine control system 200 can also include a pair of fuel pumps 140(1) and 140(2), each of which supplies fuel to one side of the engine. For example, first fuel pump 140(1) supplies fuel to the first set of injectors 112(1). With further reference to FIG. 9, the first fuel pump 140(1) supplies fuel via fuel lines 144 that connect to a plurality of plenums 142. Each plenum 142 supplies fuel to two injectors. For example, the plenum 142, shown in FIG. 9, supplies fuel to injector 212(1) and 211(1). In some embodiments, the fuel pumps 140(1) and 140(2) are interconnected such that if one or the other of the pumps fails, the other pump can provide fuel to one or both sets of injectors, possibly at reduced power.

Figure 10:
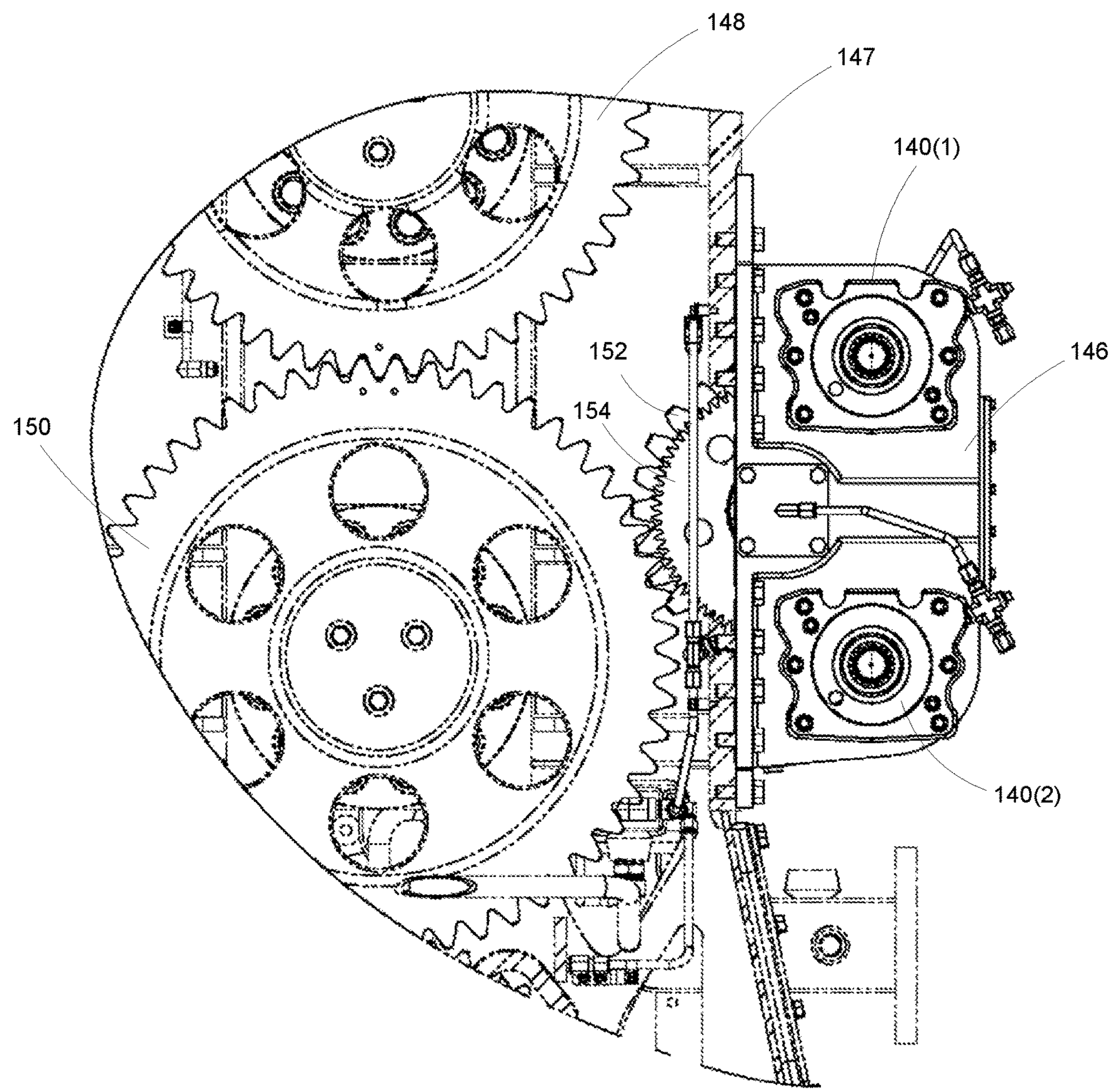
FIG. 10 is an enlarged partial view in cross-section of the fuel pump drive housing assembly.
Figure 11:
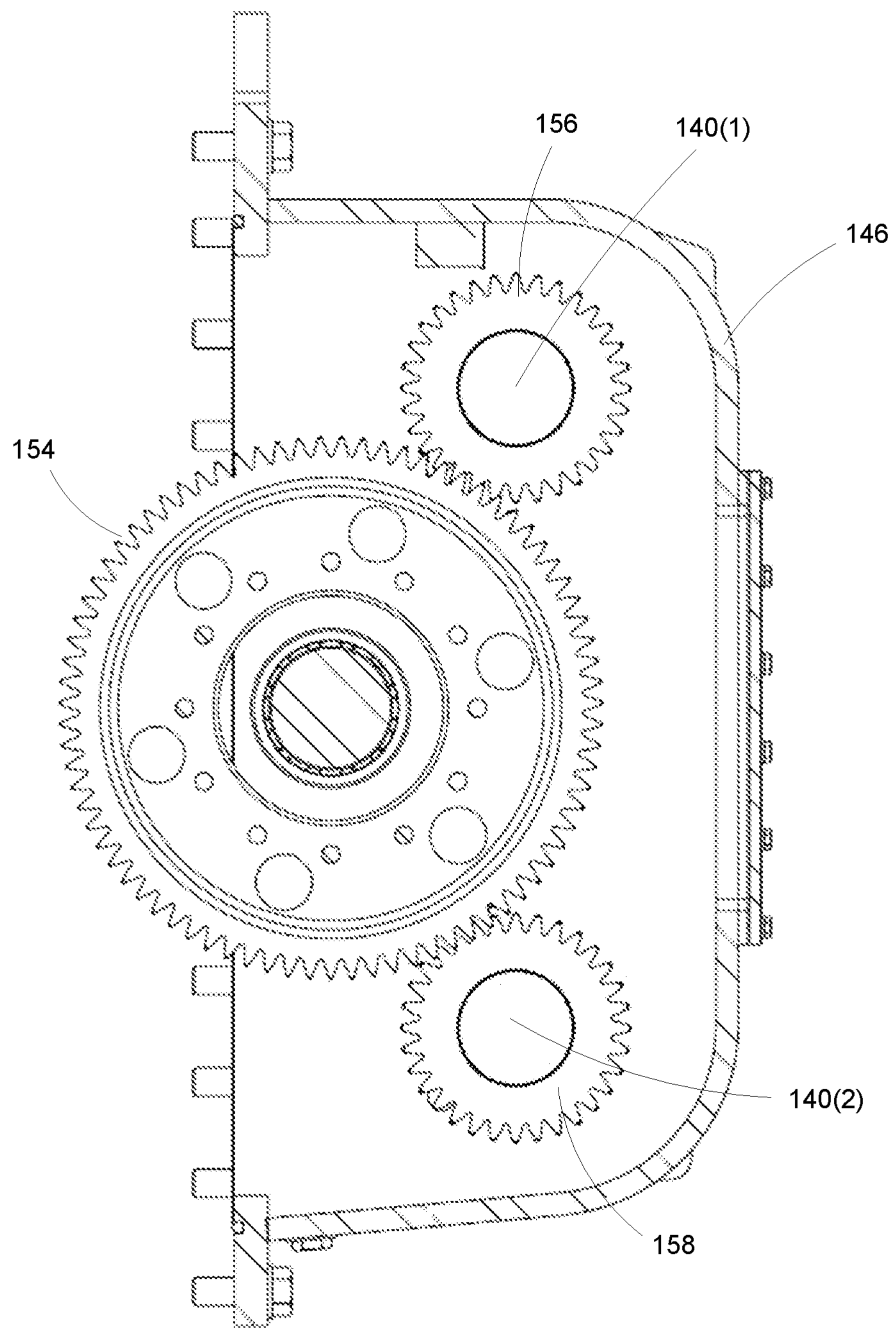
FIG. 11 is a partial cross-section of the fuel pump drive train.

FIG. 10 shows the fuel pumps 140(1) and 140(2) mounted on a drive housing 146. The drive housing 146 supports a gear train including a fuel pump drive gear 152 that mates with a plurality of spur gears including spur gears 148 and 150. The spur gears 148 and 150 interconnect the upper and lower crankshafts to maintain proper timing between the crankshafts and their associated pistons. The drive housing 146 mounts the fuel pumps to the engine block 147 to position the gear train for engagement with the spur gear 150. The pumps are driven by a pump drive gear 154 that is mounted to the drive gear 152. As shown in FIG. 11, the first fuel pump 140(1) is connected to pump drive gear 154 via a first pump gear 156. Similarly, the second fuel pump 140(2) is connected to the pump drive gear 154 by a second pump gear 158.

Figure 12:
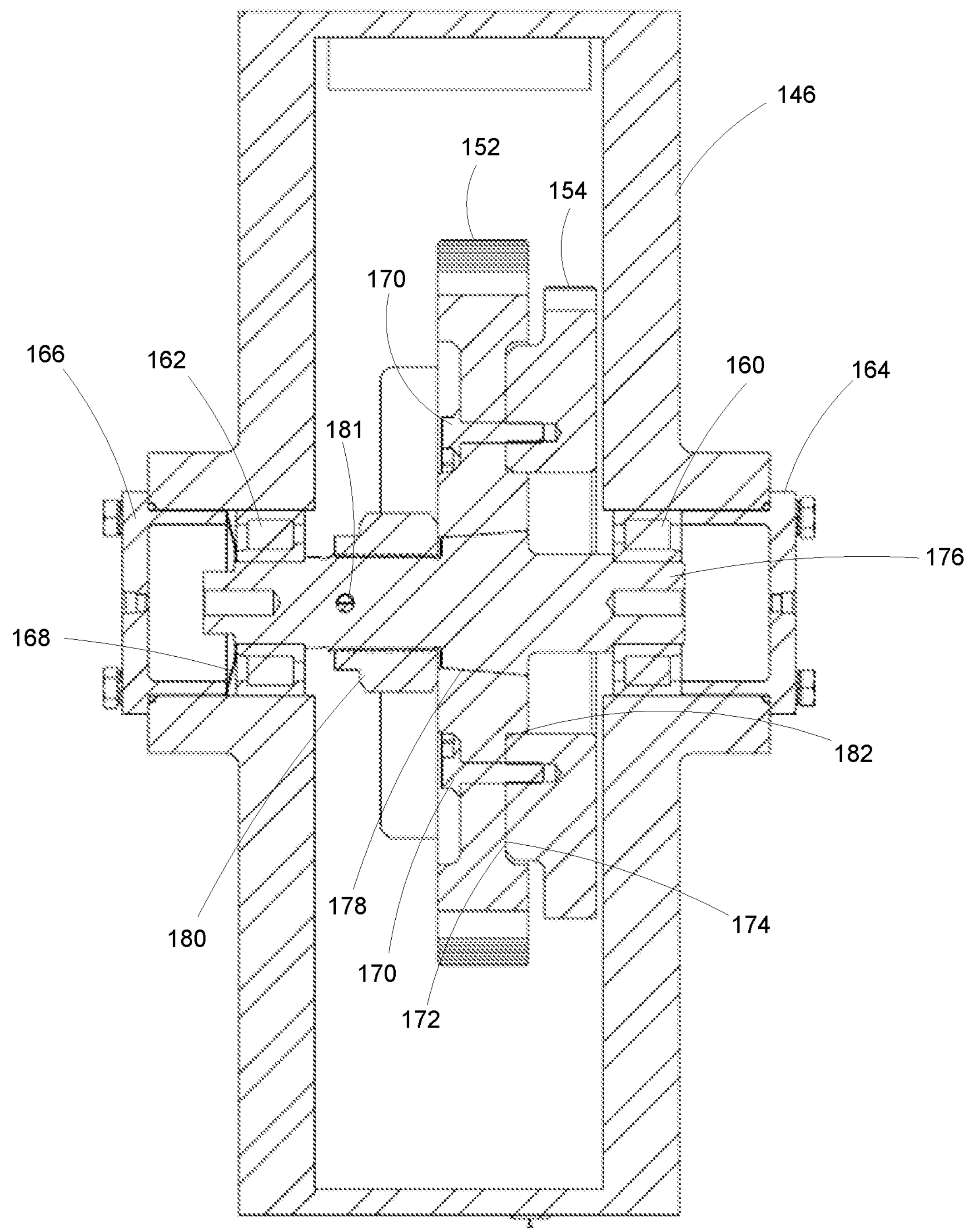
FIG. 12 is a cross-sectional view of the fuel pump drive train assembly.

As shown in FIG. 12, the pump drive gear 154 is attached to the drive gear 152 with a plurality of fasteners 170. Drive gear 152 includes a groove 172 formed around a circumference of the gear that is sized and configured to receive a mating ring 174 formed on the pump drive gear 154. In some embodiments, the pump drive gear 154 is indexed to the drive gear 152 at inner diameter 182. Accordingly, the pump gear 154 rotates with the drive gear 152. Drive gear 152 is mounted on an idler shaft 176 that is mounted in roller bearings 160 and 162. Bearings 160 and 162 are mounted in housing 146 and are retained in position with end caps 164 and 166, respectively. A wave washer 168 is positioned between bearing 162 and end cap 166 to provide a centering force for shaft 176 while also allowing end play between the shaft and the bearing. Shaft 176 includes a tapered journal 178 upon which the drive gear 152 is mounted and retained in position by castellated nut 180. The castellated nut 180 is, in turn, retained in position with a cotter pin 181.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Some aspects of the technology described above may take the form of or make use of computer-executable instructions, including routines executed by a programmable computer. Those skilled in the relevant art will appreciate that aspects of the technology can be practiced on computer systems other than those described herein. The technology can be embodied in a computer or data processor, such as an engine control unit (ECU), engine control module (ECM), fuel system controller, or the like, that is specifically programmed, configured or constructed to perform one or more computer-executable instructions consistent with the technology described herein. Accordingly, the term "computer," "processor," or "controller", as generally used herein, refers to any data processor and can include ECUs, ECMs, and modules, as well as Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, or dedicated display device or mechanism (e.g., a gauge).

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including but not limited to magnetic or optically readable or removable computer disks, as well as distributed electronically over networks. Such networks may include, for example and without limitation, Controller Area Networks (CAN), Local Interconnect Networks (LIN), and the like. In particular embodiments, data structures and transmissions of data particular to aspects of the technology are also encompassed within the scope of the technology.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A bilateral engine control system for use on a multi-cylinder opposed piston engine, the system comprising:

a first set of fuel injectors mountable on a first side of an engine, each in fluid communication with a corresponding cylinder of the engine;

a second set of fuel injectors mountable on a second side of the engine, each in fluid communication with one of the corresponding cylinders of the engine;

a first engine control unit connected to the first set of injectors for control thereof;

a second engine control unit connected to the second set of injectors for control thereof;

a first crankshaft speed sensor and a second crankshaft speed sensor connected to the first engine control unit and the second engine control unit, respectively; and one or more communication lines connecting the first and second engine control units, whereby signals from the first and second crankshaft speed sensors are shared between the first and second engine control units;

wherein the first engine control unit independently controls the first set of injectors and the second engine control unit independently controls the second set of injectors.

2. The system of claim 1, further comprising first and second fuel pumps operative to provide fuel to the first set of injectors and the second set of injectors, respectively.

3. The system of claim 1, further comprising a first set of engine sensors and a second set of engine sensors connected to the first engine control unit and the second engine control unit, respectively.

4. The system of claim 1, wherein the first engine control unit and the second engine control unit are configured to activate each injector of the first set of injectors and a corresponding injector of the second set of injectors at substantially the same time.

5. A multi-cylinder opposed piston engine, comprising:

a plurality of cylinders;

a first set of pistons each positioned in a respective one of the plurality of cylinders and connected to a first crankshaft;

a second set of pistons each positioned in a respective one of the plurality of cylinders and connected to a second crankshaft;

a first set of fuel injectors mounted on a first side of the plurality of cylinders, each in fluid communication with a corresponding one of the plurality of cylinders;

a second set of fuel injectors mounted on a second side of the plurality of cylinders, each in fluid communication with one of the corresponding one of the plurality of cylinders;

a first engine control unit connected to the first set of injectors for control thereof;

a second engine control unit connected to the second set of injectors for control thereof;

a first crankshaft speed sensor and a second crankshaft speed sensor connected to the first engine control unit and the second engine control unit, respectively, and wherein the first engine control unit independently controls the first set of injectors based on the first speed signal and the second engine control unit independently controls the second set of injectors based on the second speed signal; and one or more communication lines connecting the first and second engine control units, whereby the first and second speed signals are shared between the first and second engine control units;

wherein the first engine control unit independently controls the first set of injectors and the second engine control unit independently controls the second set of injectors.

6. The engine of claim 5, wherein each injector of the first set of injectors is diametrically opposed to a corresponding injector of the second set of injectors.

7. The engine of claim 5, further comprising first and second fuel pumps operative to provide fuel to the first set of injectors and the second set of injectors, respectively.

8. The engine of claim 7, wherein the first and second fuel pumps are each geared to the first and second crankshafts.

9. The engine of claim 5, wherein the first engine control unit and the second engine control unit are configured to activate each injector of the first set of injectors and a corresponding injector of the second set of injectors at substantially the same time.

10. The engine of claim 5, further comprising a first set of engine sensors and a second set of engine sensors connected to the first engine control unit and the second engine control unit, respectively.

* * * * *